US008269698B2

(12) United States Patent
Lee et al.

(10) Patent No.: US 8,269,698 B2
(45) Date of Patent: Sep. 18, 2012

(54) ELECTRO-LUMINESCENCE DISPLAY DEVICE AND DRIVING METHOD THEREOF

(75) Inventors: Han Sang Lee, Gyeonggi-do (KR); Hae Yeol Kim, Gyeonggi-do (KR)

(73) Assignee: LG Display Co., Ltd., Seoul (KR)

(*) Notice: Subject to any disclaimer, the term of this patent is extended or adjusted under 35 U.S.C. 154(b) by 370 days.

(21) Appl. No.: 12/576,415

(22) Filed: Oct. 9, 2009

(65) Prior Publication Data

US 2010/0156880 A1 Jun. 24, 2010

Related U.S. Application Data

(62) Division of application No. 11/023,782, filed on Dec. 29, 2004, now Pat. No. 7,605,543.

(30) Foreign Application Priority Data

Mar. 25, 2004 (KR) ............................ 10-2004-20348

(51) Int. Cl.
*G09G 3/30* (2006.01)
*G06F 3/038* (2006.01)

(52) U.S. Cl. ......................................... 345/76; 345/210

(58) Field of Classification Search .................... 345/36, 345/45, 76–83, 209–210
See application file for complete search history.

(56) References Cited

U.S. PATENT DOCUMENTS 5,835,170 A * 11/1998 Fujiwara et al. ................ 349/38
6,677,713 B1 1/2004 Sung .......................... 315/169.1
6,924,602 B2 8/2005 Komiya ..................... 315/169.3
7,053,031 B2 5/2006 Jeschke et al. ................ 510/189
7,109,958 B1 * 9/2006 Martin ............................ 345/87
7,180,244 B2 * 2/2007 Lee ........................... 315/169.1
7,358,949 B2 * 4/2008 Chen ............................... 345/92
8,068,078 B2 * 11/2011 Lee et al. ........................ 345/95
2002/0158587 A1 10/2002 Komiya ..................... 315/169.3
2002/0195968 A1 12/2002 Sanford et al. ............. 315/169.3
2004/0119673 A1 * 6/2004 Park ............................... 345/87
2004/0135751 A1 * 7/2004 Kwon et al. .................... 345/87
2005/0140599 A1 * 6/2005 Lee et al. ........................ 345/76

FOREIGN PATENT DOCUMENTS

JP 2000-347612 12/2000
JP 2002-091376 3/2002
JP 2002-244617 8/2002
JP 2004-118132 4/2004
JP 2005-004173 1/2005
JP 2005-514493 5/2005
JP 2005-164894 6/2005
JP 2005-195756 7/2005
JP 2005-227310 8/2005
WO WO 2005/034072 4/2005

* cited by examiner

*Primary Examiner* — Amr Awad
*Assistant Examiner* — Kenneth Bukowski
(74) *Attorney, Agent, or Firm* — Morgan, Lewis & Bockius LLP

(57) ABSTRACT

An electro-luminescence display device includes an electro-luminescence panel having a plurality of pixels at pixel areas defined by intersections between data lines and gate lines, each of the pixels including: an electro-luminescence cell connected to receive a supply voltage, a driving thin film transistor controlling a current amount flowing through the electro-luminescence cell, and a bias switch connected to a gate terminal of the driving thin film transistor, the bias switch selectively applying an inverse voltage to the driving thin film transistor.

9 Claims, 15 Drawing Sheets

ELECTRO-LUMINESCENCE DISPLAY DEVICE AND DRIVING METHOD THEREOF

The present application is a divisional application of application Ser. No. 11/023,782, filed on Dec. 29, 2004, now U.S. Pat. No. 7,605,543 which claims the benefit of Korean patent Application No. P2004-20348 filed in Korea on Mar. 25, 2004, which is hereby incorporated by reference.

BACKGROUND OF THE INVENTION

1. Field of the Invention

The present invention relates to an electro-luminescence display (ELD) device, and more particularly, to an electro-luminescence display device and a driving method thereof that prevents driving thin film transistors from becoming deteriorated with a lapse of time and maintains a reliability of the driving thin film transistors.

2. Discussion of the Related Art

Many efforts have been made to research and develop various flat display devices, such as liquid crystal display (LCD) devices, field emission display (FED) devices, plasma display panel (PDP) devices, and electro-luminescence (EL) display devices, as a substitute for cathode ray tube (CRT) devices. These flat display devices have advantageous characteristics of thin profile, lightness, and compact size. In addition, an electro-luminescence (EL) display device has another advantage in that it is a self-luminous type display capable of emitting light using a phosphorous material.

An EL display device generally is classified as an inorganic EL device if the phosphorous material includes an inorganic material or is classified as an organic EL device if the phosphorous material includes an organic compound. In general, an organic EL device includes an electron injection layer, an electron carrier layer, a light-emitting layer, a hole carrier layer and a hole injection layer disposed between a cathode and an anode. When a predetermined voltage is applied between the anode and the cathode, electrons produced from the cathode are moved, via the electron injection layer and the electron carrier layer, into the light-emitting layer, while holes produced from the anode are moved, via the hole injection layer and the hole carrier layer, into the light-emitting layer. Thus, the electrons and the holes fed from the electron carrier layer and the hole carrier layer are re-combined at the light-emitting layer, thereby emitting light.

The organic ELD generally is manufactured using a relatively simple process including a deposition process and an encapsulation process. Thus, an organic ELD has a low production cost. Further, the organic ELD can operate using a low DC voltage, thereby having a low power consumption and a fast response time. The organic ELD also has a wide viewing angle and a high image contrast. Moreover, since the organic ELD is an integrated device, the organic ELD has high endurance from external impacts and a wide range of applications.

A passive matrix type ELD that does not have a switching element has been widely used. In the passive matrix type ELD, scan lines intersect signal lines defining a plurality of pixels in a matrix-arrangement, and the scan lines are sequentially driven to excite each of the pixels. However, to achieve a required mean luminescence, a moment luminance needs to be as high as the luminance obtained by multiplying the mean luminescence by the number of lines.

There also exists an active matrix type ELD, which includes thin film transistors as switching elements within each pixel. The voltage applied to the pixels are charged in a storage capacitor Cst so that the voltage can be applied until the next frame signal is applied, thereby continuously driving the organic ELD regardless of the number of gate lines until a picture of images is finished. Accordingly, the active matrix type ELD provides uniform luminescence, even when a low current is applied.

FIG. 1 is a schematic block diagram illustrating an active matrix type electro-luminescence display device according to the related art. In FIG. 1, an active matrix type EL display device includes an EL panel 20 having pixels 28 arranged at intersections between gate lines GL and data lines DL, a gate driver 22 for driving the gate lines GL, and a data driver 24 for driving the data lines DL. The gate driver 22 sequentially applies a scanning pulse to the gate lines GL to drive the gate lines GL. In addition, the data driver 24 converts digital data signals inputted from an exterior source to analog data signals and applies the analog data signals to the data lines DL whenever the scanning pulse is supplied. Each of the pixels 28 receives the data signal from a respective one of the data lines DL when the scanning pulse is applied to a corresponding one of the gate lines GL, to thereby generate light corresponding to the data signal.

FIG. 2 is a detailed circuit diagram illustrating a pixel of the electro-luminescence display device shown in FIG. 1. As shown in FIG. 2, each of the pixels 28 includes an EL cell OEL having an anode connected to a supply voltage source VDD and a cathode connected to a cell driver 30. The cell driver 30 also is connected to the respective gate line GL, the respective data line DL and a ground voltage source GND to drive the EL cell OEL.

In addition, the cell driver 30 includes a switching thin film transistor T1, a driving thin film transistor T2, and a storage capacitor Cst. The switching thin film transistor T1 includes a gate terminal connected to the respective gate line GL, a source terminal connected to the respective data line DL, and a drain terminal connected to a first node N1. The driving thin film transistor T2 includes a gate terminal connected to the first node N1, a source terminal connected to the ground voltage source GND, and a drain terminal connected to the EL cell OEL. The storage capacitor Cst is connected between the ground voltage source GND and the first node N1.

Further, the switching thin film transistor T1 is turned ON, when a scanning pulse is applied to the respective gate line GL. When the switching thin film transistor T1 is turned ON, it applies the data signal supplied to the respective data line DL to the first node N1. Then, the data signal supplied to the first node N1 is charged into the storage capacitor Cst and applied to the gate terminal of the driving thin film transistor T2. The driving thin film transistor T2 controls a current amount I fed, via the EL cell OEL, from the supply voltage source VDD in response to the data signal, to thereby control a light-emission amount of the EL cell OEL.

Moreover, the driving thin film transistor T2 can keep a turn-ON state by the data signal charged in the storage capacitor Cst even though the switching thin film transistor T1 is turned OFF, and can still control a current amount I fed, via the EL cell OEL, from the supply voltage source VDD until a data signal at the next frame is applied. In this case, the current amount I flowing the EL cell OEL can be expressed as the following equation:

$$I = \frac{W}{2L} Cox(Vg2 - Vth)^2 \tag{1}$$

"W" represents a width of the driving thin film transistor T2, and "L" represents a length of the driving thin film transistor T2. Further, "Cox" represents a value of a capacitor provided by an insulating film forming a single layer when the driving thin film transistor T2 is manufactured. Also, "Vg2" represents a voltage value of a data signal inputted to the gate terminal of the driving thin film transistor T2, and "Vth" represents a threshold voltage value of the driving thin film transistor T2.

In the above equation (1), "W," "L," "Cox" and "Vg2" are constantly maintained irrespectively of a lapse of time. However, the threshold voltage value "Vth" of the driving thin film transistor T2 deteriorates with the lapse of time.

In particular, a positive (+) voltage is continuously supplied to the gate terminal of the driving thin film transistor T2. Specifically, the continuously applied positive voltage causes the threshold voltage Vth of the driving thin film transistor T2 to be increased with a lapse of time. In addition, as the threshold voltage Vth of the driving thin film transistor T2 increases, a current amount flowing through the EL cell OEL is reduced, thereby decreasing an image brightness and deteriorating an image quality.

FIGS. 3A and 3B are diagrams illustrating atomic arrangements of amorphous silicon, and FIG. 4 is a graph illustrating a deterioration of a driving thin film transistor of the pixel shown in FIG. 2. The driving thin film transistor T2 (shown in FIG. 2) is made from hydride amorphous silicon. Hydride amorphous silicon can be easily made in a large dimension and can be deposited on a substrate at a low temperature of less than 350° C. Thus, a majority of thin film transistors have been made using hydride amorphous silicon.

However, as shown in FIG. 3A, hydride amorphous silicon has an irregular atomic arrangement having a weak/dangling Si—Si bond 32. As shown in FIG. 3B, with the lapse of time, Si breaks from the weak bond, and electrons or holes are re-combined at the atom-departed place. Since an energy level is changed due to a variation in the atomic arrangement of the hydride amorphous silicon, the threshold voltage Vth of the driving thin film transistor T2 is increased gradually into Vth', Vth'' and Vth''' as shown in FIG. 4 with the lapse of time.

Accordingly, the image brightness of the electro-luminescence display device according to the related art degrades over time because the threshold voltage Vth of the driving thin film transistor T2 is increased to Vth', Vth'' or Vth''' with the lapse of time. In addition, since a partial brightness reduction of the EL panel 20 produces a residual image, thereby seriously deteriorating an image quality.

SUMMARY OF THE INVENTION

Accordingly, the present invention is directed to an electro-luminescence display device and a driving method thereof that substantially obviate one or more of the problems due to limitations and disadvantages of the related art.

An object of the present invention is to provide an electro-luminescence display device and a driving method thereof that are adaptive for preventing a rise in a threshold voltage of a driving thin film transistor provided for each pixel, thereby improving a picture quality.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, an electro-luminescence display device includes an electro-luminescence panel having a plurality of pixels at pixel areas defined by intersections between data lines and gate lines, each of the pixels including: an electro-luminescence cell connected to receive a supply voltage, a driving thin film transistor controlling a current amount flowing through the electro-luminescence cell, and a bias switch connected to a gate terminal of the driving thin film transistor, the bias switch selectively applying an inverse voltage to the driving thin film transistor.

In another aspect, an electro-luminescence display device includes an electro-luminescence panel having a plurality of pixels at pixel areas defined by intersections between data lines and gate lines, the gate lines receiving one of a scanning pulse and a turn-off signal, and an electro-luminescence cell, a driving thin film transistor and a bias switch provided for each of the pixels, for the pixel connected to an $n^{th}$ one of the gate lines (GLn, n being an integer), the corresponding electro-luminescence cell connected to receive a supply voltage, the corresponding driving thin film transistor controlling a current amount flowing through the electro-luminescence cell, the corresponding bias switch selectively supplying the turn-off signal to the corresponding driving thin film transistor.

In yet another aspect, a method of driving an electro-luminescence display device having a driving thin film transistor provided for each of pixels arranged in a matrix-like manner, includes sequentially applying a scanning pulse to gate lines, applying a data signal to a gate terminal of the driving thin film transistor for the pixel connected to an $n^{th}$ one of the gate lines (GLn, n being an integer) when said scanning pulse is applied to the $n^{th}$ gate line (GLn), controlling a current flowing from a supply voltage source, via an electro-luminescence cell for the pixel connected to the $n^{th}$ gate line (GLn), to a reference voltage source based on said data signal, and selectively supplying an inverse voltage to the gate terminal of the driving thin film transistor for the pixel connected to the $n^{th}$ gate line (GLn).

In another aspect, a method of driving an electro-luminescence display device having first gate lines, second gate lines, data lines, pixels at pixel areas defined by intersection between the first gate lines and the data lines, each of the pixels including an electro-luminescence cell and a driving thin film transistor, includes sequentially applying a scanning pulse to the first gate lines, sequentially applying a turn-on pulse to the second gate lines, applying a data signal to a gate terminal of the driving thin film transistor for the pixel connected to an $n^{th}$ one of the first gate lines (GL1n, n being an integer) when said scanning pulse is applied to the $n^{th}$ first gate line (GL1n), controlling a current flowing from a supply voltage source, via the electro-luminescence cell, to a reference voltage source based on said data signal, and supplying an inverse voltage to the gate terminal of the driving thin film transistor connected to the $n^{th}$ first gate line (GL1n) when said turn-on pulse is applied to an $n^{th}$ one of the second gate lines (GL2n).

In yet another aspect, a method of driving an electro-luminescence display device having a driving thin film transistor provided for each of pixels arranged in a matrix-like manner, includes applying one of a scanning pulse and a turn-off signal to gate lines, applying a data signal to a gate terminal of the driving thin film transistor for a pixel connected to an $n^{th}$ one of the gate lines (GLn, n being an integer) when said scanning pulse is applied to the $n^{th}$ gate line (GLn), controlling a current flowing from a supply voltage source, via an electro-luminescence cell for the pixel connected to the $n^{th}$ gate line (GLn), to a reference voltage source based on said data signal, and selectively supplying said turn-off voltage to the gate terminal of the driving thin film transistor for the pixel connected to the $n^{th}$ gate line (GLn).

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments, examples of which are illustrated in the accompanying drawings.

Figure 1:
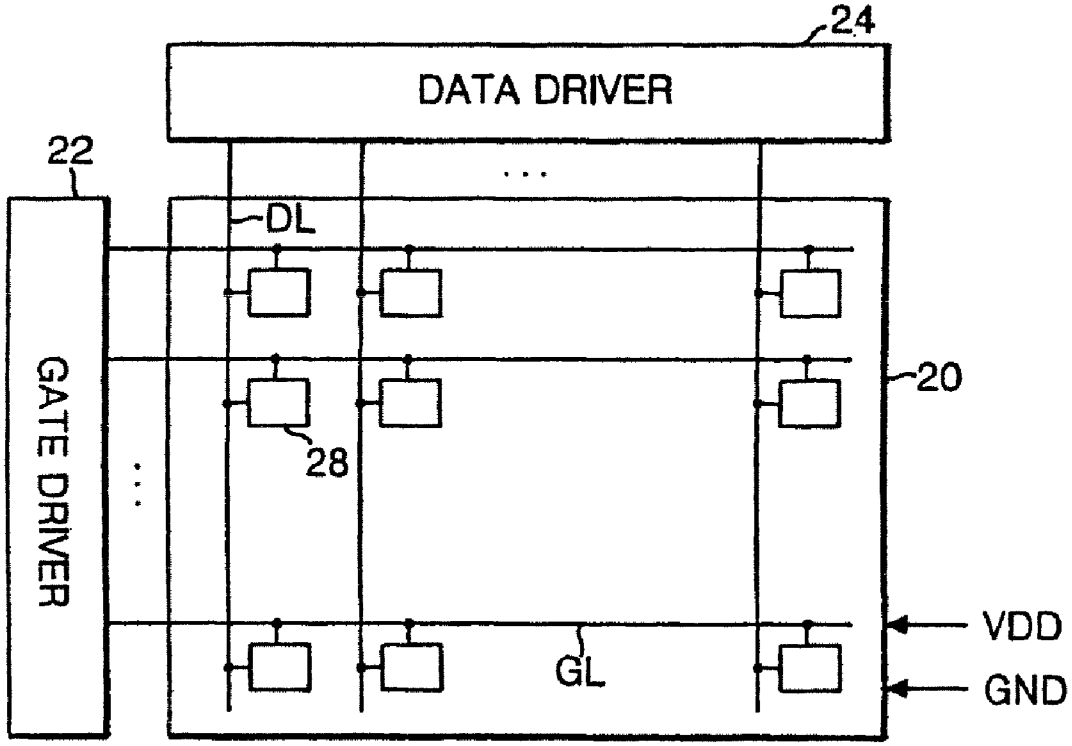
FIG. 1 RELATED ART
FIG. 1 is a schematic block diagram illustrating an active-matrix type electro-luminescence display device according to the related art.
Figure 2:
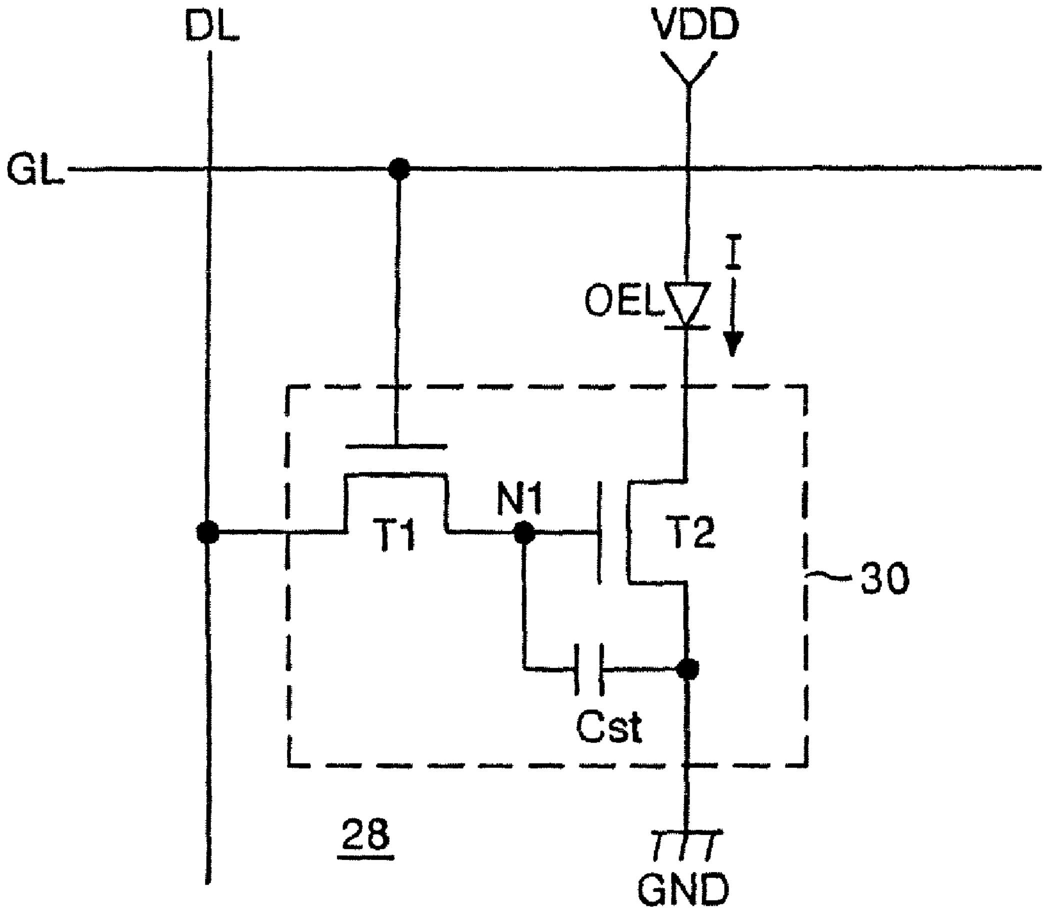
FIG. 2 RELATED ART
FIG. 2 is a detailed circuit diagram illustrating a pixel of the electro-luminescence display device shown in FIG. 1.
Figure 3A:
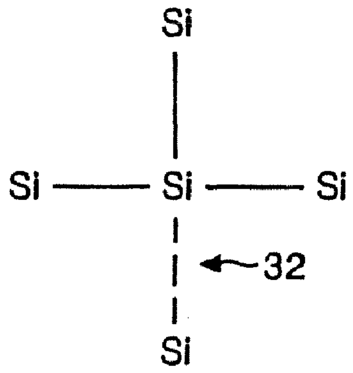
FIG.3A RELATED ART
FIGS. 3A and 3B are diagrams illustrating atomic arrangements of amorphous silicon.
Figure 3B:
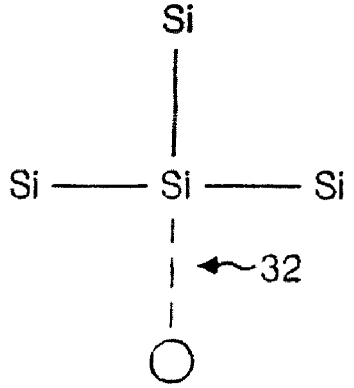
FIG.3B RELATED ART
Figure 4:
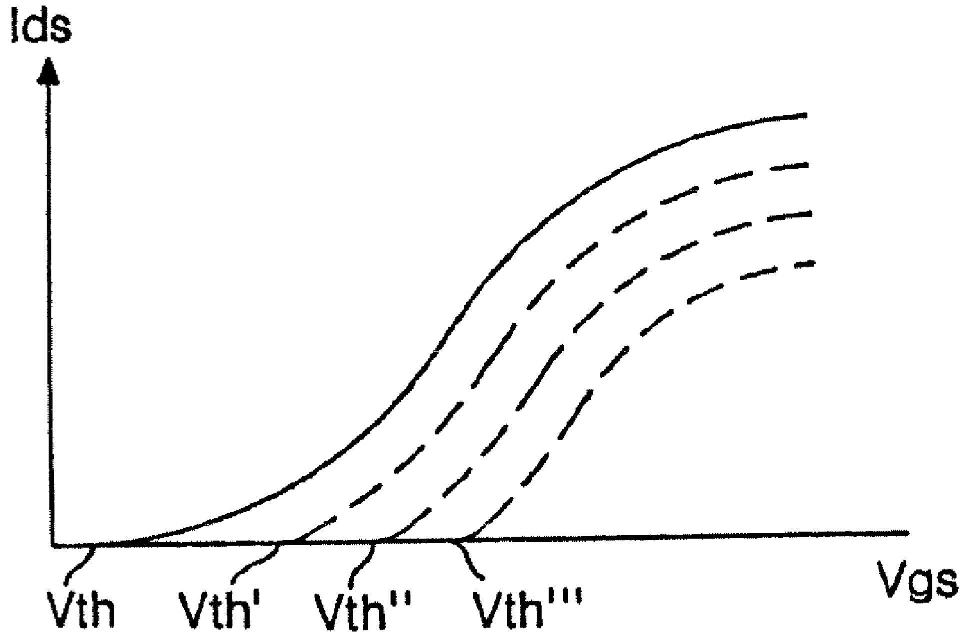
FIG. 4 RELATED ART
FIG. 4 is a graph illustrating a deterioration of a driving thin film transistor of the pixel shown in FIG. 2.
Figure 5:
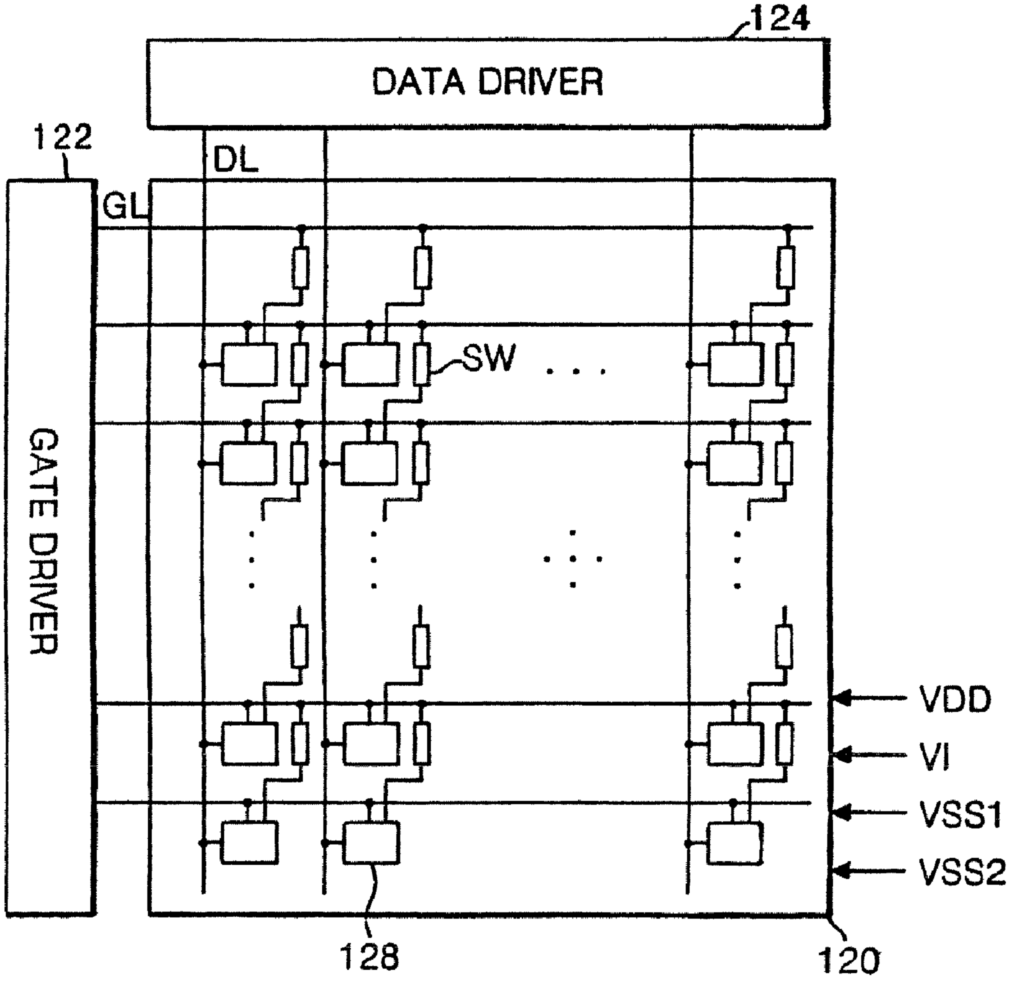
FIG. 5 is a schematic block diagram illustrating an electro-luminescence display device according to an embodiment of the present invention.

FIG. 5 is a schematic block diagram illustrating an electro-luminescence display device according to an embodiment of the present invention. In FIG. 5, an electro-luminescence (EL) display device includes an EL panel 120 having a plurality of gate lines GL and data lines DL intersecting each other, a gate driver 122 for driving the gate lines GL, a data driver 124 for driving the data lines DL, and at least one source (not shown) for supplying a supply voltage VDD, an inverse voltage VI, a first reference voltage VSS1 and a second reference voltage VSS2 to the EL panel 120. The EL panel 120 also includes a plurality of pixels 128 arranged at pixel areas defined by intersections between the gate and data lines GL and DL, and a plurality of bias switches SW controlled by a respective one of the gate lines GL. The number of the pixels 128 may be the same as the number of the bias switches SW. For instance, the bias switches SW may be controlled by the $(n-1)^{th}$ gate line GLn−1 (n being an integer) to supply the inverse voltage VI to the pixels 128 connected to the $n^{th}$ gate line GLn.

In addition, the gate driver 122 applies scanning pulses to the gate lines GL to sequentially drive the gate lines GL. The data driver 124 converts digital data signals inputted from an exterior source into analog data signals and applies the analog data signals to the data lines DL whenever the scanning pulse is supplied. For instance, a HIGH-state scanning pulse may be applied sequentially to the gate lines GL, such that the data signals from the data lines DL are applied to the pixels 128 connected to the gate line GL receiving the HIGH-state scanning pulse. As a result, the pixels 128 generate light corresponding to the data signals.

Further, the bias switch SW may be turned ON when the HIGH-state scanning pulse is applied from the $(n-1)^{th}$ gate line GLn−1, thereby applying the inverse voltage VI to the pixels 128 connected to the $n^{th}$ gate line GLn. Although not shown, instead of arranging the bias switch SW higher than the pixel 128 to which it supplies the inverse voltage VI by one horizontal line, a position of the bias switch SW can be variously established in consideration of a process condition. For instance, the bias switch SW may be arranged at the same horizontal line as the pixel 128 to which it supplies the inverse voltage VI.

Figure 6:
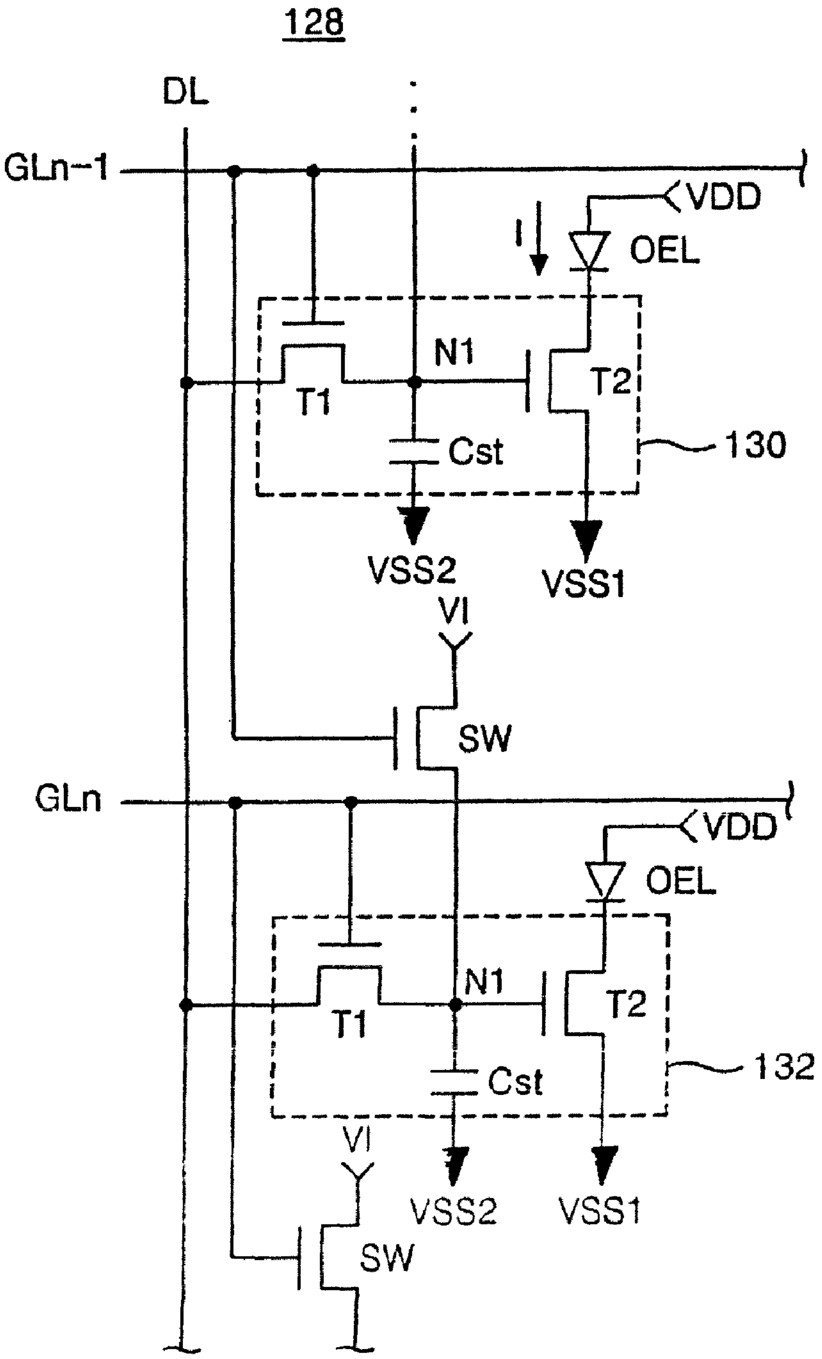
FIG. 6 is a detailed circuit diagram illustrating a pixel of the electro-luminescence display device shown in FIG. 5.

FIG. 6 is a detailed circuit diagram illustrating a pixel of the electro-luminescence display device shown in FIG. 5. As shown in FIG. 6, each of the pixels 128 includes an EL cell OEL having an anode connected to receive the supply voltage VDD, and a cell driver 130 connected to a cathode of the EL cell OEL, a respective one of the gate lines GL, a respective one of the data lines DL, the first reference voltage VSS1 and the second reference voltage VSS2.

The cell driver 130 includes a switching thin film transistor T1, a driving thin film transistor T2, and a storage capacitor Cst. The storage capacitor Cst is connected to a source supplying the second reference voltage VSS2 and to a first node N1. The first node N1 is between the switching thin film transistor T1 and the driving thin film transistor T2. In particular, the switching thin film transistor T1 includes a gate terminal connected to the respective gate line GL, a source terminal connected to the respective data line DL, and a drain terminal connected to the first node N1. The driving thin film transistor T2 includes a gate terminal connected to the first node N1, a source terminal connected to a source supplying the first reference voltage VSS1, and a drain terminal connected to the EL cell OEL.

Voltage values of the first and second reference voltages VSS1 and VSS2 are set to be lower than a voltage value of the supply voltage VDD. For instance, voltage values of the first and second reference voltages VSS1 and VSS2 may be set to a voltage value approximately less than a ground voltage GND, such that a current I can flow through the driving thin film transistor T2, and a voltage value of the supply voltage VDD may have a positive polarity. Voltage values of the first and second reference voltages VSS1 and VSS2 generally may be set equal to each other. For instance, the first and second reference voltages VSS1 and VSS2 may equal to the ground voltage GND. However, voltage values of the first and second reference voltages VSS1 and VSS2 may be different from each other due to various factors, e.g., a resolution of the EL panel 120 and a process condition of the EL panel 120.

In addition, the switching thin film transistor T1 is turned ON when the HIGH-state scanning pulse is applied to the respective gate line GL, to thereby apply a data signal supplied to the respective data line DL to the first node N1. The data signal supplied to the first node N1 is charged into the storage capacitor Cst and applied to the gate terminal of the driving thin film transistor T2. Further, the driving thin film transistor T2 controls a current amount I flowing from a source of the supply voltage VDD, via the EL cell OEL, into the first reference voltage VSS1 in response to the data signal applied thereto. As a result, the EL cell OEL generates light corresponding to the current amount I. Furthermore, the driving thin film transistor T2 may remain turned ON by the data signal charged in the storage capacitor Cst even if the switching thin film transistor T1 is turned OFF.

Moreover, the bias switch SW has a gate terminal connected to the $(n-1)^{th}$ gate line GLn−1, a source terminal connected to receive the inverse voltage VI and a drain terminal of the first node N1 of a next-stage cell driver 132. The bias switch SW is turned ON when a HIGH-state scanning pulse is applied to the $(n-1)^{th}$ gate line GLn−1, thereby applying the inverse voltage VI to the first node N1 of the next-stage cell driver 132, which is connected to the $n^{th}$ gate line GLn. A value of the inverse voltage VI may be set to be lower than the value of the first reference voltage VSS1.

Accordingly, when the inverse voltage VI is supplied to the first node N1 and to the gate terminal of the driving thin film transistor T2 of the next-stage cell driver 132, a voltage at the source terminal of the driving thin film transistor T2, i.e., the first reference voltage VSS1, is higher than a voltage at the gate terminal of the driving thin film transistor T2. As a result, an inverse bias voltage is applied to the driving thin film transistor T2 as the inverse voltage VI is supplied to the first node N1, thereby preventing the threshold voltage Vth of the driving thin film transistor T2 from being increased with a lapse of time. Consequently, since an inverse bias voltage is supplied to the driving thin film transistor 12 of the pixel connected to the $n^{th}$ gate line GLn when a HIGH-state scanning pulse is applied to the $(n-1)^{th}$ gate line GLn−1, a deterioration of the driving thin film transistor T2 is prevented and the threshold voltage Vth of the driving thin film transistor T2 is maintained constant even with a lapse of time.

Figure 7:
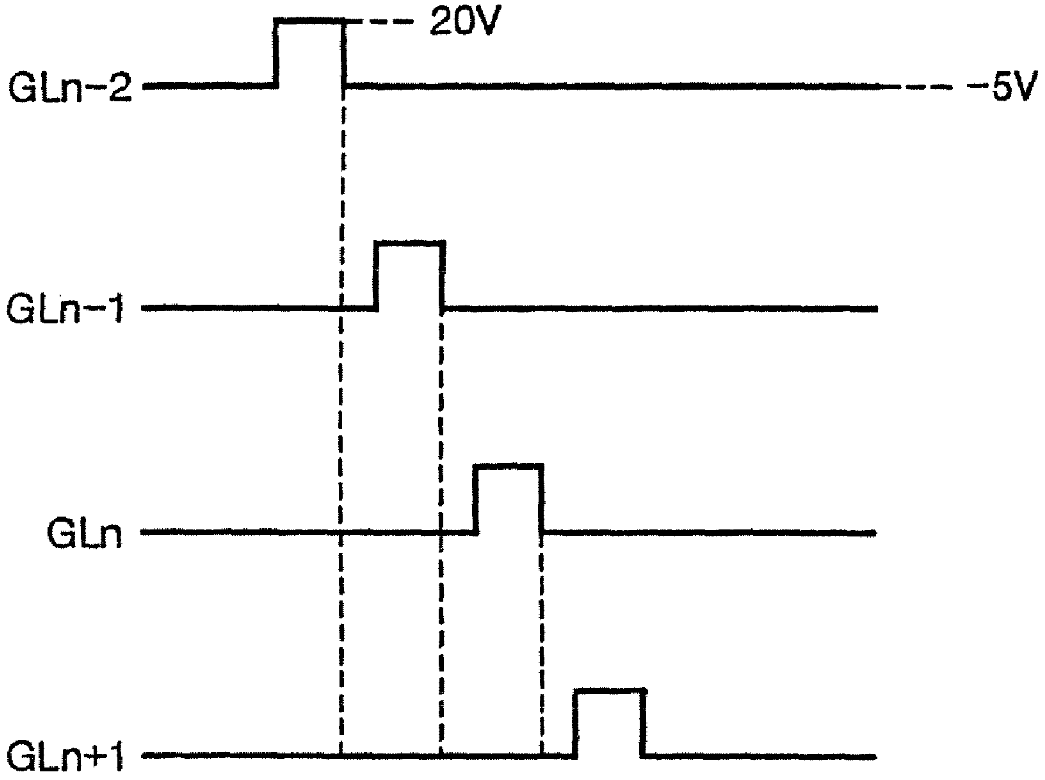
FIG. 7 is a graph illustrating scanning pulses applied to gate lines of the electro-luminescence display device shown in FIG. 5.

FIG. 7 is a graph illustrating scanning pulses applied to gate lines of the electro-luminescence display device shown in FIG. 5. As shown in FIG. 7, a HIGH-state scanning pulse may be applied sequentially from the gate driver 122 (shown in FIG. 5) to the gate lines GLn−2, GLn−1, GLn and GLn+1, thereby sequentially driving the gate lines GLn−2, GLn−1, GLn and GLn+1. The HIGH-state scanning pulse may have a voltage level of about 20V while a LOW-state scanning pulse may have a voltage level of about −5V.

Referring to FIGS. 6 and 7, when the HIGH-state scanning pulse is applied to the $(n-1)^{th}$ gate line GLn−1, the switching thin film transistor T1 of the cell driver 130 connected to the $(n-1)^{th}$ gate line GLn−1 is turned ON. As the switching thin film transistor T1 is turned ON, a data signal supplied to the data line DL is applied to the first node N1 of the cell driver 130. Then, the driving thin film transistor T2 of the cell driver 130 is turned ON by the data signal applied to the first node N1, thereby applying the current I corresponding to the data signal from a source supplying the supply voltage VDD to the first reference voltage VSS1 and thus generating light corresponding to the current I from the EL cell OEL.

In addition, the bias switch SW connected to the next-stage cell driver 132 of the $n^{th}$ gate line GLn is turned ON by the HIGH-state scanning pulse applied to the $(n-1)^{th}$ gate line GLn−1. When the bias switch SW is turned ON, then the inverse voltage VI is applied to the first node N1 of the next-stage cell driver 132 connected to the $n^{th}$ gate line GLn. Further, since the voltage value of the inverse voltage VI is lower than the voltage value of the first reference voltage VSS1, an inverse bias voltage is applied to the source terminal and the gate terminal of the driving thin film transistor T2 of the next-stage cell driver 132. As the inverse bias voltage is applied to the driving thin film transistor T2 of the next-stage cell driver 132, the threshold voltage Vth of the driving thin film transistor T2 remains constant and does not rise with a lapse of time.

Figure 8:
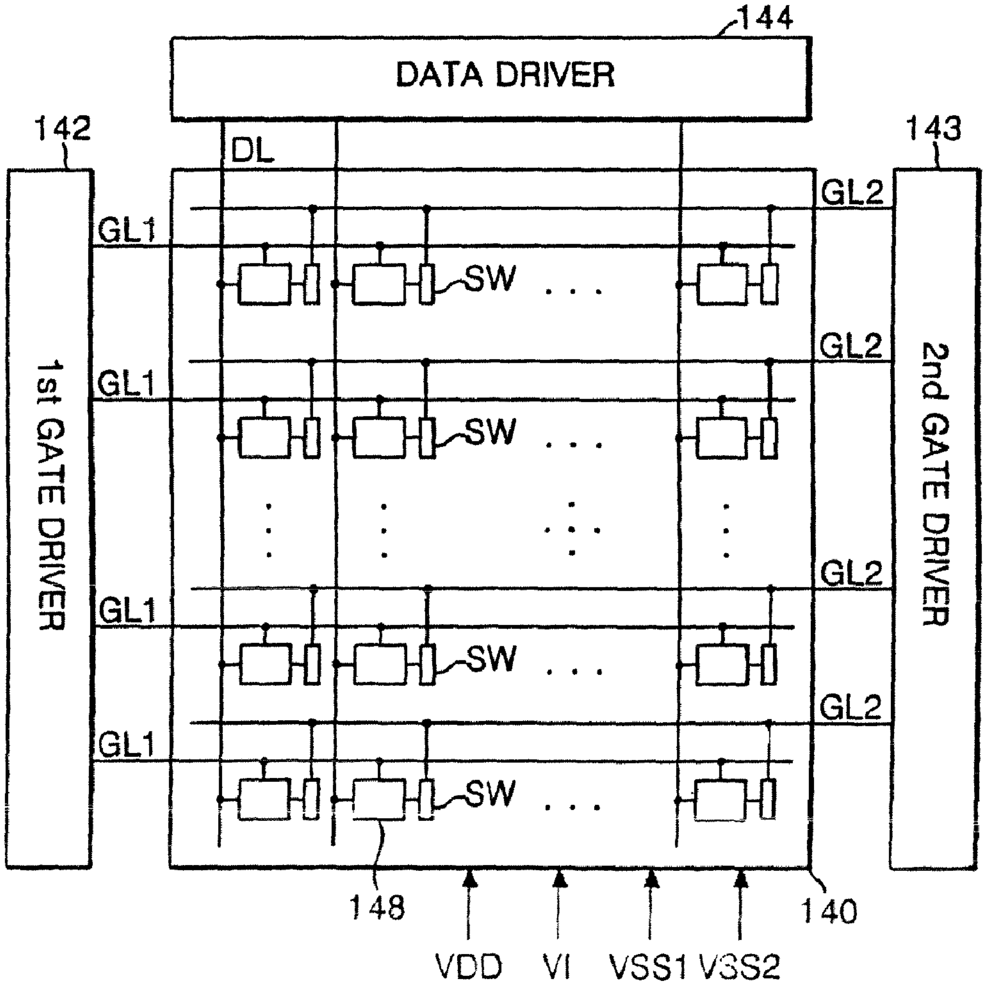
FIG. 8 is a schematic block diagram illustrating an electro-luminescence display device according to another embodiment of the present invention.

FIG. 8 is a schematic block diagram illustrating an electro-luminescence display device according to another embodiment of the present invention. In FIG. 8, an electro-luminescence (EL) display device includes an EL panel 140 having a plurality of first gate lines GL1 a plurality of second gate lines GL2, and a plurality of data lines DL, the gate lines GL1 and GL2 intersecting the data lines DL. The number of the first gate lines GL1 may be the same as the number of the second gate lines GL2, such that each of the second gate lines GL2 is paired with a respective one of the first gate lines GL1.

In addition, the EL display device also includes a first gate driver 142 for driving the first gate lines GL1, a second gate driver 143 for driving the second gate lines GL2, a data driver 144 for driving the data lines DL, and at least one source (not shown) for supplying a supply voltage VDD, an inverse voltage VI, a first reference voltage VSS1 and a second reference voltage VSS2 to the EL panel 140. The EL panel 140 also includes a plurality of pixels 148 arranged at pixel areas defined by intersections between the gate lines GL1 and GL2 and the data lines DL, and a plurality of bias switches SW controlled by a respective one of the second gate lines GL2 to supply the inverse voltage to the pixels 148. The number of the pixels 148 may be the same as the number of the bias switches SW.

Further, the first gate driver 142 applies scanning pulses to the first gate lines GL1 to sequentially drive the first gate lines GL1. The second gate driver 143 applies turn-on pulses to the second gate lines GL2 to sequentially turn ON the bias switches SW row-by-row. The data driver 144 converts digital data signals inputted from an exterior source into analog data signals and applies the analog data signals to the data lines DL whenever the scanning pulse is supplied.

For instance, a HIGH-state scanning pulse may be applied sequentially to the first gate lines GL1, and the second gate driver 143 may apply a turn-on pulse to the $n^{th}$ second gate line GL2n immediately prior to the HIGH-state scanning pulse being applied to the $n^{th}$ first gate line GLn. As a result, the bias switches SW connected to the $n^{th}$ second gate line GL2n are turned ON, thereby applying the inverse voltage VI to the pixels 148 connected to the $n^{th}$ first gate line GL1n. Then, as the HIGH-state scanning pulse is applied to the $n^{th}$ first gate line GL1n, such that the data signals from the data lines DL are applied to the pixels 148 connected to the $n^{th}$ first gate line GL1n, thereby generating light corresponding to the data signals.

Figure 9:
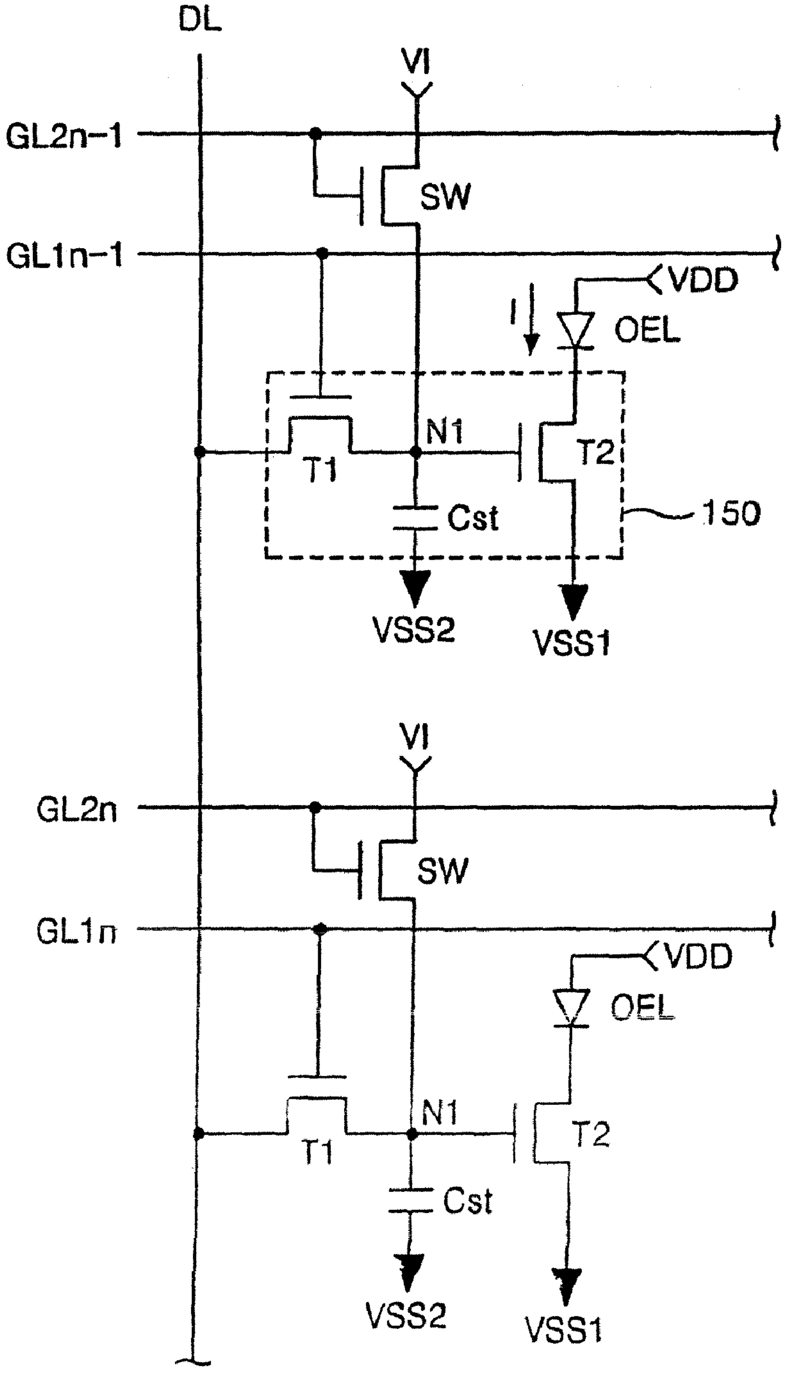
FIG. 9 is a detailed circuit diagram illustrating a pixel of the electro-luminescence display device shown in FIG. 8.

FIG. 9 is a detailed circuit diagram illustrating a pixel of the electro-luminescence display device shown in FIG. 8. As shown in FIG. 9, each of the pixels 148 includes an EL cell OEL having an anode connected to receive a supply voltage VDD, and a cell driver 150 connected to a cathode of the EL cell OEL, a respective one of the first gate lines GL1, a respective one of he data lines DL, the first reference voltage VSS1 and the second reference voltage VSS2.

The cell driver 150 includes a switching thin film transistor T1, a driving thin film transistor T2, and a storage capacitor Cst. The storage capacitor Cst is connected to a source supplying the second reference voltage VSS2 and to a first node N1. In particular, the switching thin film transistor T1 includes a gate terminal connected to the respective first gate line GL1, a source terminal connected to the respective data line DL, and a drain terminal connected to the first node N1. The driving thin film transistor T2 includes a gate terminal connected to the first node N1, a source terminal connected to a source supplying the first reference voltage VSS1, and a drain terminal connected to the EL cell OEL.

Voltage values of the first and second reference voltages VSS1 and VSS2 are set to be lower than a voltage value of the supply voltage VDD. For instance, voltage values of the first and second reference voltages VSS1 and VSS2 may be set to a voltage value approximately less than a ground voltage source GND such that a current I can flow through the driving thin film transistor T2, and a voltage value of VDD may have a positive polarity. Voltage values of the first and second reference voltages VSS1 and VSS2 generally may be set equally to each other. For instance, the first and second reference voltages VSS1 and VSS2 may equal to the ground voltage GND. However, voltage values of the first and second reference voltages VSS1 and VSS2 may be set differently from each other due to various factors, e.g., a resolution of the EL panel 140 and a process condition of the EL panel 140.

In addition, the switching thin film transistor T1 is turned ON when the HIGH-state scanning pulse is applied to the respective first gate line GL1, to thereby apply a data signal supplied to the respective data line DL to the first node N1. The data signal supplied to the first node N1 is charged into the storage capacitor Cst and applied to the gate terminal of the driving thin film transistor T2. Further, the driving thin film transistor T2 controls a current amount I flowing from a source of the supply voltage VDD, via the EL cell OEL, into the first reference voltage VSS1 in response to the data signal applied thereto. As a result, the EL cell OEL generates light corresponding to the current amount I. Furthermore, the driving thin film transistor T2 may remain turned ON by the data signal charged in the storage capacitor Cst even if the switching thin film transistor T1 is turned OFF.

Moreover, the bias switch SW has a gate terminal connected to the respective second gate line GL2, a source terminal connected to receive the inverse voltage VI and a drain terminal of the first node N1. The bias switch SW is turned ON when a turn-on pulse is applied to the $n^{th}$ second gate line GL2n, thereby applying the inverse voltage VI to the first node N1 of the cell driver 150 connected to the $n^{th}$ first gate line GL1n. A value of the inverse voltage VI may be set to be lower than the value of the first reference voltage VSS1.

Accordingly, when the inverse voltage VI is supplied to the first node N1 and to the gate terminal of the driving thin film transistor T2 of the cell driver 150, a voltage at the source terminal of the driving thin film transistor T2, i.e., the first reference voltage VSS1, is higher than a voltage at the gate terminal of the driving thin film transistor T2. As a result, an inverse bias voltage is applied to the driving thin film transistor T2 as the inverse voltage VI is supplied to the first node N1, thereby preventing the threshold voltage Vth of the driving thin film transistor T2 from being increased with a lapse of time. Consequently, since an inverse bias voltage is supplied to the driving thin film transistor T2 of the pixel 148 connected to the $n^{th}$ first gate line GL1n when a turn-on pulse is applied to the $n^{th}$ second gate line GL2n, a deterioration of the driving thin film transistor T2 is prevented and the threshold voltage Vth of the driving thin film transistor T2 is maintained constant even with a lapse of time.

Figure 10:
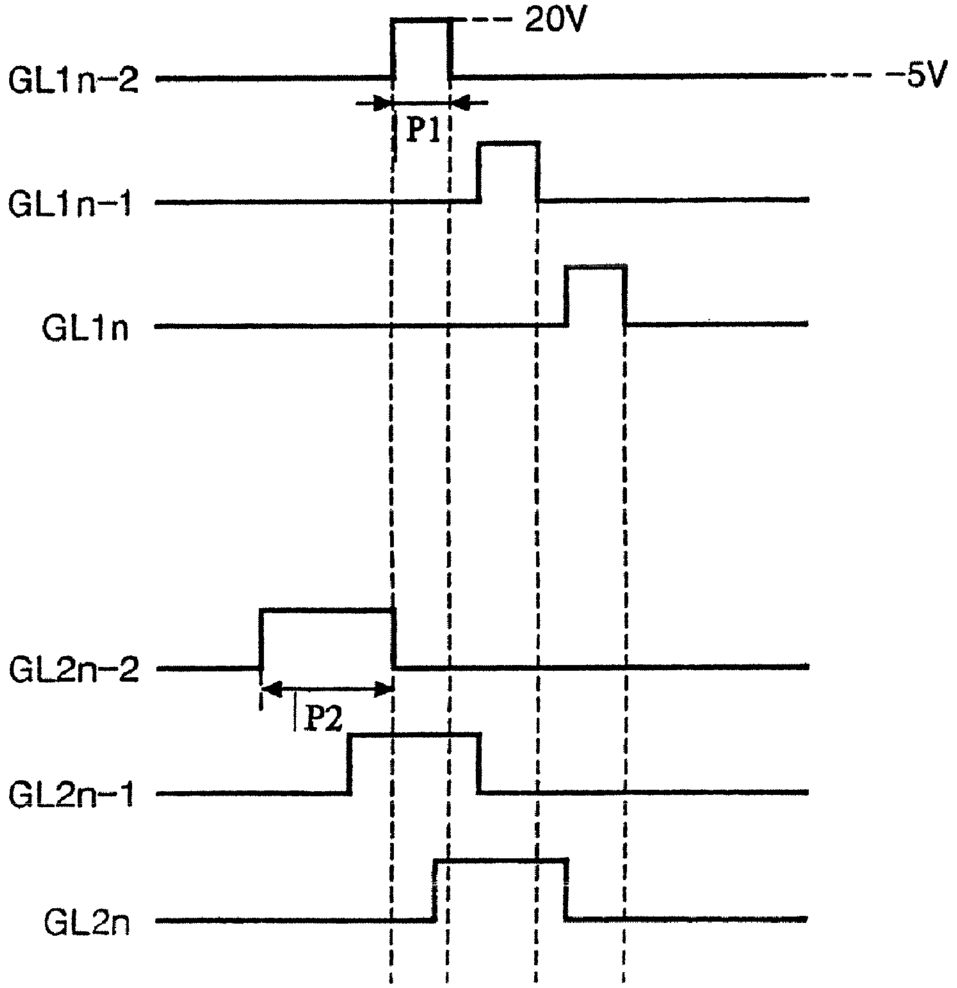
FIG. 10 is a graph illustrating scanning pulses and turn-on pulses applied to the first and second gate lines of the electro-luminescence display device shown in FIG. 8.
Figure 11:
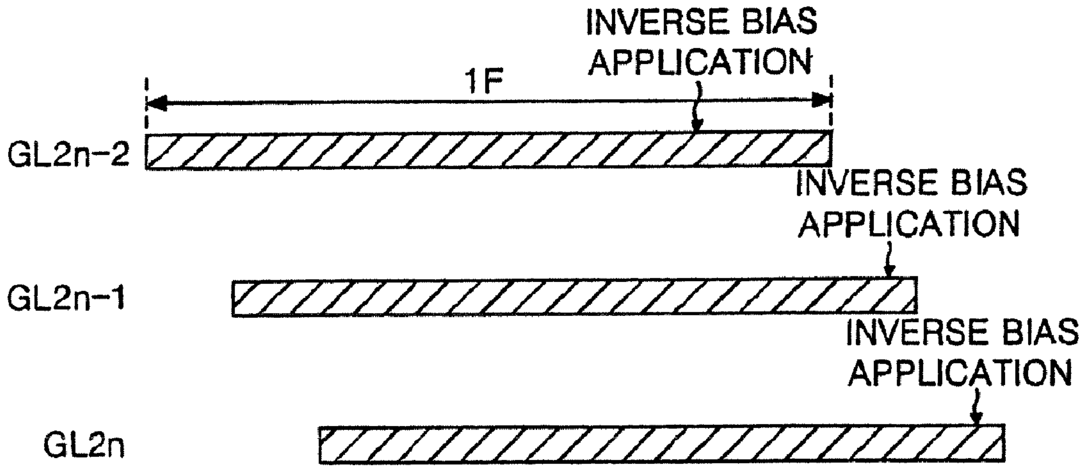
FIG. 11 is a graph illustrating an application time of an inverse bias.

FIG. 10 is a graph illustrating scanning pulses and turn-on pulses applied to the first and second gate lines of the electroluminescence display device shown in FIG. 8, and FIG. 11 is a graph illustrating an application time of an inverse bias. As shown in FIG. 10, a HIGH-state scanning pulse may be applied sequentially from the first gate driver 142 (shown in FIG. 8) to the first gate lines GL1n−2, GL1n−1 and GL1n, thereby sequentially driving the first gate lines GL1n−2, GL1n−1 and GL1n. The HIGH-state scanning pulse may have a voltage level of about 20V while a LOW-state scanning pulse may have a voltage level of about −5V.

In addition, the HIGH-state scanning pulse and the turn-on pulse that are applied to the $n^{th}$ first and second gate lines GL1n and GL2n do not overlap each other, thereby producing a stable image by the EL cell OEL. In particular, the pixels 148 (shown in FIG. 8) begin displaying an image corresponding to a data signal applied when the HIGH-state scanning pulse is applied and maintain the image until the next data signal is applied. Thus, if a turn-on pulse is applied just after the HIGH-state scanning pulse has been applied, a display time of an image corresponding to the data signal is shortened. Accordingly, an embodiment of the present invention applies a turn-on pulse to the $n^{th}$ second gate line GL2n while the HIGH-state scanning pulse still is applied to the $(n-1)^{th}$ first gate line GL1n-1, thereby minimizing a shortening of the picture display time.

Further, a pulse width P2 of the turn-on pulse may be larger than a pulse width P1 of the HIGH-state scanning pulse. In particular, the turn-on pulse may be applied to the $n^{th}$ second gate line GL2n just before the HIGH-state scanning pulse is applied to the $n^{th}$ first gate line GL1n, and may overlap the HIGH-state scanning pulse being applied to the $(n-1)^{th}$ first gate line GL1n−1 for forming a stable image. Since the turn-on pulse is applied to the $n^{th}$ second gate line GL2n just before the HIGH-state scanning pulse is applied to the $n^{th}$ first gate line GL1n, an image is displayed for a sufficient period of time. Thus, as shown in FIG. 11, the inverse bias voltage is applied to the driving thin film transistor T2 for a sufficient period of time, and the inverse bias applications produced by adjacent second gate lines, GL2n−2, GL2n−1 and GL2n may overlap each other.

Referring to FIGS. 9 and 10, when the HIGH-state scanning pulse is applied to the $n^{th}$ first gate line GL1n, the switching thin film transistor T1 of the cell driver 150 connected to the $n^{th}$ first gate line GL is turned ON. As the switching thin film transistor T1 is turned ON, a data signal supplied to the data line DL is applied to the first node N1 of the cell driver 150. Then, the driving thin film transistor T2 of the cell driver 150 is turned ON by the data signal applied to the first node N1, thereby applying the current I corresponding to the data signal from a source supplying the supply voltage VDD to the first reference voltage VSS1 and thus generating light corresponding to the current I from the EL cell OEL.

In addition, the turn-on pulse is applied to the $n^{th}$ second gate line GL2n such that it is not synchronized with or does not overlap the HIGH-state scanning pulse applied to the $n^{th}$ first gate line GL1n. For example, the turn-on pulse may be applied to the $n^{th}$ second gate line GL2n immediately prior to the HIGH-state scanning pulse being applied to the $n^{th}$ first gate line GL1n. When the turn-on pulse is applied to the $n^{th}$ second gate line GL2n, the bias switch SW connected to the cell driver 150 of the $n^{th}$ first gate line GL is turned ON. As the bias switch SW is turned ON, the inverse voltage VI is applied to the first node N1 of the cell driver 150 connected to the $n^{th}$ first gate line GL1n.

Further, since the voltage value of the inverse voltage VI is lower than the voltage value of the first reference voltage VSS1, an inverse bias voltage is applied to the source terminal and the gate terminal of the driving thin film transistor T2 of the cell driver 150. As the inverse bias voltage is applied to the driving thin film transistor T2 of the cell driver 150, the threshold voltage Vth of the driving thin film transistor T2 remains constant and does not rise with a lapse of time.

Accordingly, an inverse bias voltage −Vgs is applied to the source terminal and the gate terminal of the driving thin film transistor T2 of the cell driver 150 connected to the $n^{th}$ first gate line GL when a turn-on pulse is applied to the $n^{th}$ second gate line GL2n, thereby preventing the threshold voltage Vth of the driving thin film transistor T2 from being increased with a lapse of time. Thus, the EL panel 140 displays images with a desired brightness despite the lapse of time.

Figure 12:
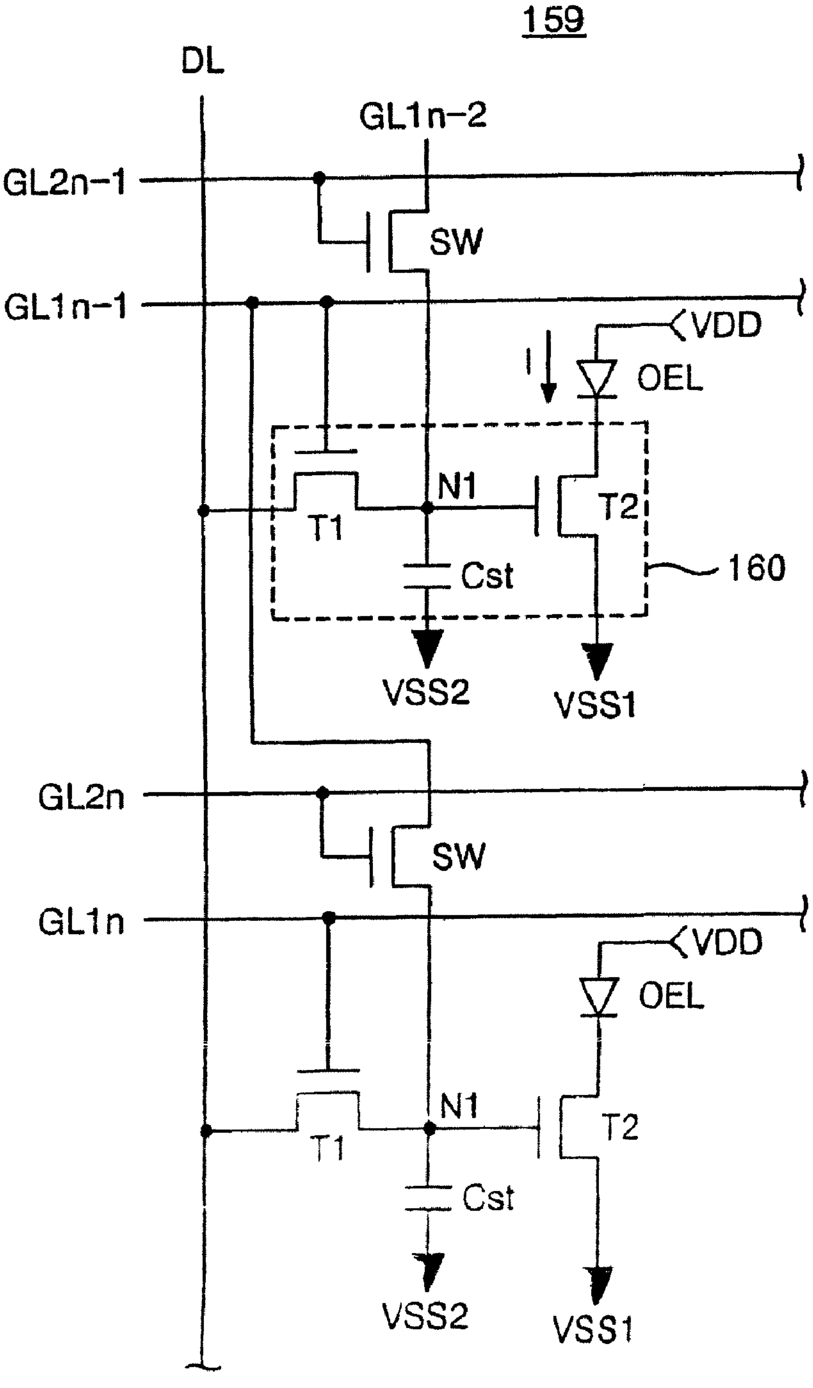
FIG. 12 is a detailed circuit diagram illustrating a pixel of an electro-luminescence display device according to another embodiment of the present invention.

FIG. 12 is a detailed circuit diagram illustrating a pixel of an electro-luminescence display device according to another embodiment of the present invention. In FIG. 12, an EL display device includes a plurality of pixels 159 arranged at pixel areas defined by intersections between first gate lines GL1n−1 and GL and data lines DL. Although only two first gate lines GL1n−1 and GL1n, one data line DL, and two pixels 159 are shown, the EL display device may include more first gate lines, data line and pixels, such that the pixels 159 are arranged in a matrix-like manner. In addition, the EL display device also includes a plurality of second gate lines GL2n−1 and GL2n paired with a respective one of the first gate lines GL1n−1 and GL1n. Each of the pixels 159 includes an EL cell OEL, a cell driver 160 and a bias switch SW. The EL cell OEL includes an anode connected to receive a supply voltage VDD and a cathode connected to the cell driver 160.

The cell driver 160 includes a switching thin film transistor T1, a driving thin film transistor T2, and a storage capacitor Cst. The storage capacitor Cst is connected to a source supplying a second reference voltage VSS2 and to a first node N1. In particular, the switching thin film transistor T1 includes a gate terminal connected to the respective one of the first gate lines GL1n−1 and GL1n, a source terminal connected to the respective data line DL, and a drain terminal connected to the first node N1. The driving thin film transistor T2 includes a gate terminal connected to the first node N1, a source terminal connected to a source supplying a first reference voltage VSS1, and a drain terminal connected to the EL cell OEL.

In addition, the bias switch SW for supplying an inverse voltage to the cell driver 160 connected to the $n^{th}$ first gate line GL has a source terminal connected to the $(n-1)^{th}$ first gate line GL1n−1, a drain terminal connected to the first node N1 of the cell driver 160 that is connected to the $n^{th}$ first gate line GL1n, and a gate terminal connected to the $n^{th}$ second gate line GL2n. As a result, the bias switch SW does not receive an inverse voltage from an additional exterior source.

The bias switch SW for supplying an inverse voltage to the cell driver 160 connected to the $n^{th}$ first gate line GL is turned ON, when a turn-on pulse is applied to the $n^{th}$ second gate line GL2n. When the turn-on pulse is applied to the n $n^{th}$ second gate line GL2n, a turn-off voltage supplied to the $(n-1)^{th}$ first gate line GL1n−1 is applied to the first node N1 of the cell driver 160 connected to the $n^{th}$ first gate line GL1n. In particular, voltage values of the first and second reference voltages VSS1 and VSS2 are set to be higher than the voltage value of the turn-off voltage. Thus, when the turn-off voltage is applied to the first node N1, a voltage at the source terminal of the driving thin film transistor T2, i.e., the first reference voltage VSS1, is higher than a voltage at the gate terminal of the driving thin film transistor T2, i.e., the turn-off voltage.

Figure 13:
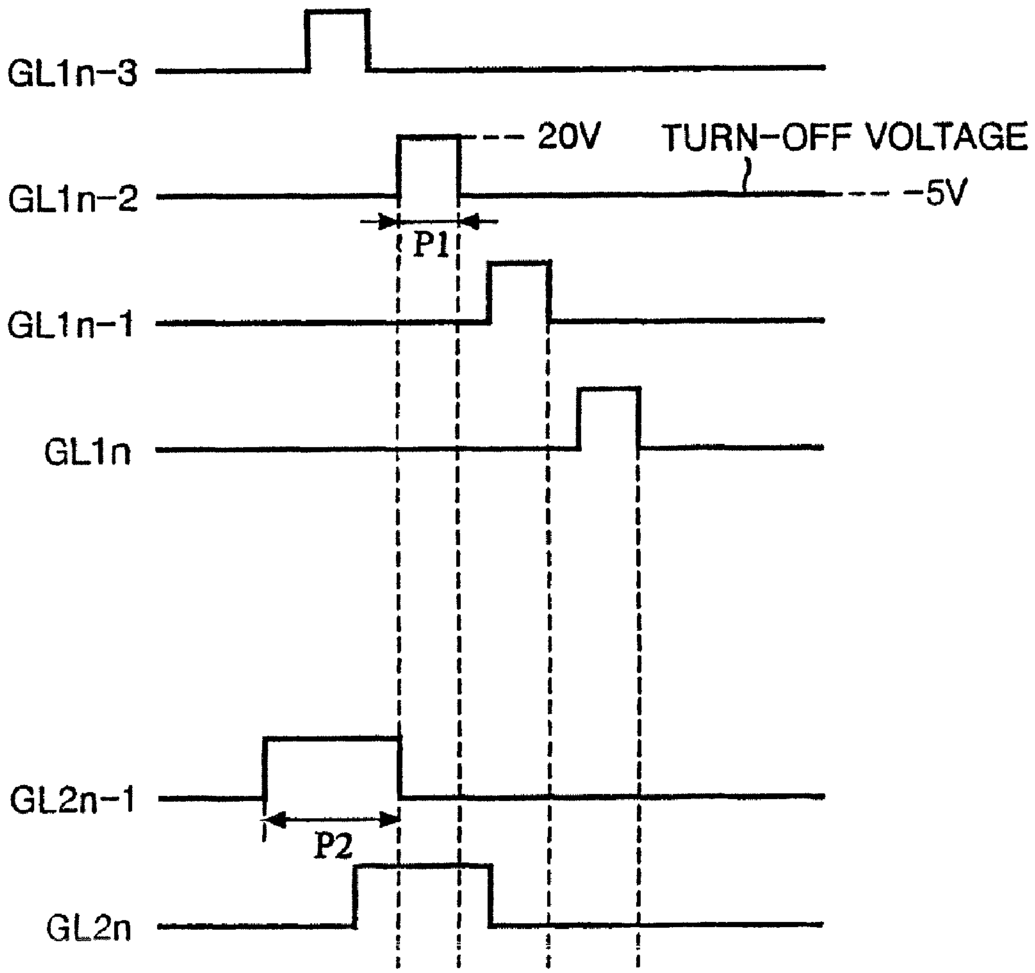
FIG. 13 is a graph illustrating scanning pulses and turn-on pulses applied to the first and second gate lines of the electro-luminescence display device shown in FIG. 12.

FIG. 13 is a graph illustrating scanning pulses and turn-on pulses applied to the first and second gate lines of the electro-luminescence display device shown in FIG. 12. As shown in FIG. 13, a HIGH-state scanning pulse is applied sequentially to the first gate lines GL1n−3, GL1n−2, GL1n−1 and GL from a first gate driver (not shown), thereby driving the pixels 159 (shown in FIG. 12) row-by-row. The HIGH-state scanning pulse may have a voltage value of about 20V while the turn-off voltage may have a negative voltage value of about −5V.

In addition, the HIGH-state scanning pulse may be applied to the first gate lines GL1n−3, GL1n−2, GL1n−1 and GL1n, while the turn-on pulse is applied to the second gate lines GL2n−1 and GL2n from a second gate driver (not shown). However, the turn-on pulse applied to the $n^{th}$ second gate line GLn2 does not overlap the HIGH-state scanning pulses applied to the $(n-1)^{th}$ and $n^{th}$ first gate lines GL1n−1 and GL1n, thereby forming a stable image. In particular, the turn-on pulse is applied to the $n^{th}$ second gate line GL2n just before the HIGH-state scanning pulse is applied to the $(n-1)^{th}$ first gate line GL1n−1 and overlaps the HIGH-state scanning pulse applied to the $(n-2)^{th}$ first gate line GL1n−2.

Moreover, a pulse width P2 of the turn-on pulse may be larger than a pulse width P1 of the HIGH-state scanning pulse. In particular, the turn-on pulse may be applied to the $n^{th}$ second gate line GL2n immediately prior to the HIGH-state scanning pulse is applied to the $(n-1)^{th}$ first gate line GL1n−1. Thus, the inverse bias voltage is applied to the driving thin film transistor T2 for a sufficient period of time. Accordingly, since the turn-on pulse is applied to the $n^{th}$ h second gate line GL2n while the HIGH-state scanning pulse is applied to the $(n-2)^{th}$ first gate line GL1n−2, an image is displayed for a sufficient period of time.

Furthermore, an inverse bias voltage is applied to the driving thin film transistor T2, thereby preventing the threshold voltage Vth of the driving thin film transistor T2 from being increased with a lapse of time. As the inverse bias voltage is applied to the driving thin film transistor T2 of the cell driver 160 connected to the $n^{th}$ first gate line GL1n by the turn-off voltage supplied to the $(n-1)^{th}$ first gate line GL1n−1 when a turn-on pulse is applied to the $n^{th}$ second gate line GL2n, the threshold voltage Vth of the driving thin film transistor T2 remains constant and does not rise with a lapse of time.

Referring to FIGS. 12 and 13, when the HIGH-state scanning pulse is applied to the $(n-1)^{th}$ first gate line GL1n−1, the switching thin film transistor T1 of the cell driver 160 connected to the $(n-1)^{th}$ first gate line GL1n−1 is turned ON. As the switching thin film transistor T1 is turned ON, a data signal supplied to the data line DL is applied to the first node N1 of the cell driver 160. Then, the driving thin film transistor T2 of the cell driver 160 is turned ON by the data signal applied to the first node N1, thereby applying a current I corresponding to the data signal from a source applying the supply voltage VDD to the first reference voltage VSS1 and thus generating light corresponding to the current I from the EL cell OEL.

In addition, the turn-on pulse is applied to the $n^{th}$ second gate line GL2n such that it does not overlap the HIGH-state scanning pulse applied to the $(n-1)^{th}$ first gate line GL1n−1 and the $n^{th}$ first gate line GL1n. When the turn-on pulse is applied to the $n^{th}$ second gate line GL2n, the bias switches SW connected to the $(n-1)^{th}$ first gate line GL1n−1 and the $n^{th}$ first gate line GL1n are turned ON. As the bias switch SW is turned ON, a turn-off voltage supplied to the $(n-1)^{th}$ first gate line GL1n−1 is applied, via the bias switch SW, to the first node N1 of the cell driver 160 connected to the $n^{th}$ first gate line GL1n. Since the turn-off voltage is lower than the first reference voltage VSS1, an inverse bias voltage is applied to the source terminal and the gate terminal of the driving thin film transistor T2 of the cell driver 160. As the inverse bias voltage is applied to the driving thin film transistor T2 of the cell driver 160, the threshold voltage Vth of the driving thin film transistor T2 remains constant and does not rise with a lapse of time.

Accordingly, an inverse bias voltage −Vgs is applied to the source terminal and the gate terminal of the driving thin film transistor T2 of the cell driver 160 connected to the $n^{th}$ first gate line GL1n when a turn-on pulse is applied to the $n^{th}$ second gate line GL2n, thereby preventing the threshold voltage Vth of the driving thin film transistor T2 from being increased with a lapse of time. Thus, the EL display device according to an embodiment of the present invention displays images with a desired brightness despite the lapse of time.

Figure 14:
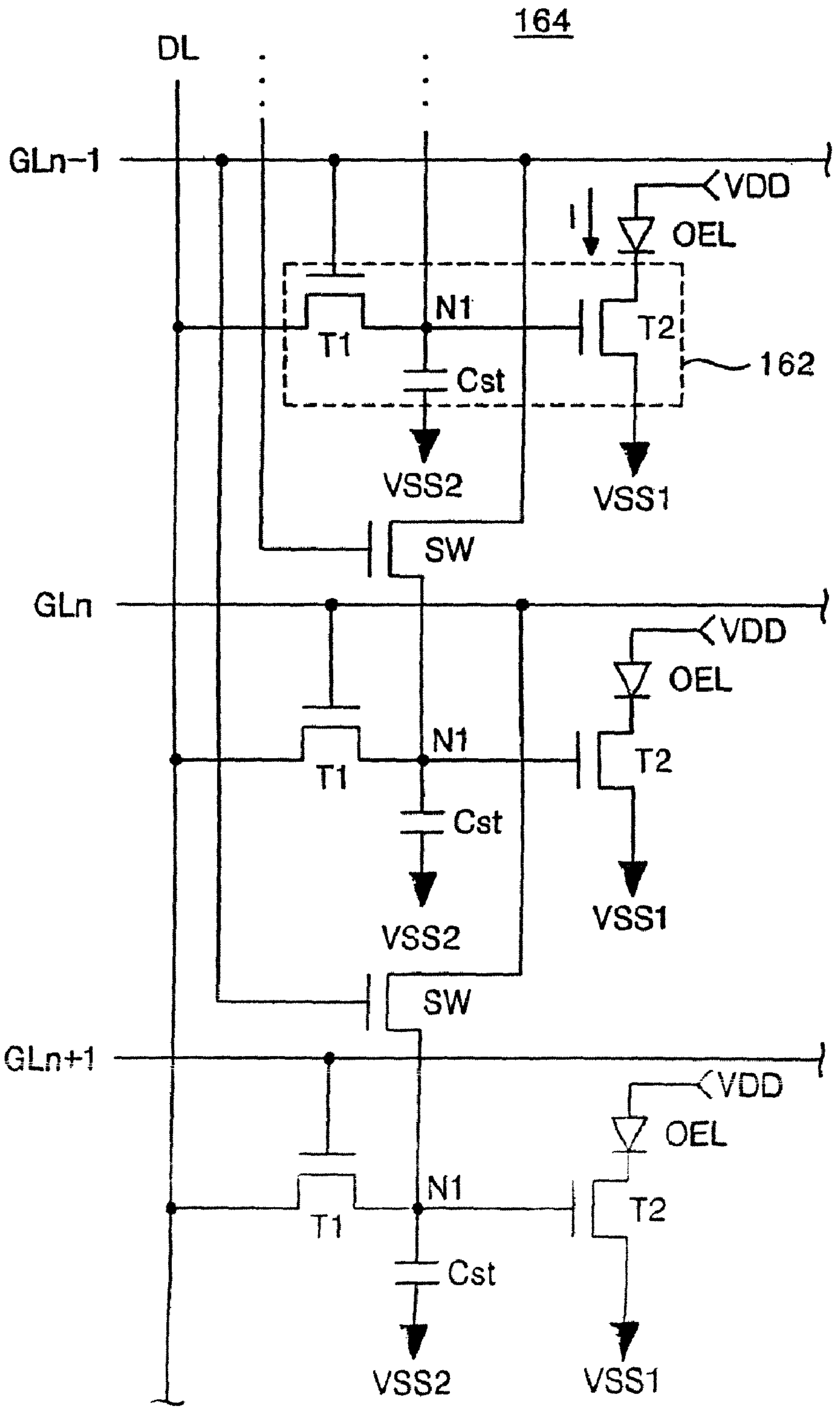
FIG. 14 is a detailed circuit diagram illustrating a pixel of an electro-luminescence display device according to yet another embodiment of the present invention.

FIG. 14 is a detailed circuit diagram illustrating a pixel of an electro-luminescence display device according to yet another embodiment of the present invention. In FIG. 14, an EL display device includes a plurality of pixels 164 arranged in pixel areas defined by intersections between gate lines GLn−1, GLn, and GLn+1 and data lines DL. Although only three gate lines GLn−1, GLn, and GLn+1, one data line DL, and three pixels 164 are shown, the EL display device may include more gate lines, data lines and pixels, such that the pixels 164 are arranged in a matrix-like manner. In addition, each of the pixels 164 includes an EL cell OEL, a cell driver 162 and a bias switch SW. The EL cell OEL includes an anode connected to receive a supply voltage VDD and a cathode connected to the cell driver 162.

The cell driver 162 includes a switching thin film transistor T1, a driving thin film transistor T2, and a storage capacitor Cst. The storage capacitor Cst is connected to a source supplying a second reference voltage VSS2 and to a first node N1. In particular, the switching thin film transistor T1 includes a gate terminal connected to a respective one of the gate lines GLn−1, GLn, and GLn+1, a source terminal connected to the respective data line DL, and a drain terminal connected to the first node N1. The driving thin film transistor T2 includes a gate terminal connected to the first node N1, a source terminal connected to a source supplying a first reference voltage VSS1, and a drain terminal connected to the EL cell OEL.

In addition, the bias switch SW for supplying an inverse voltage to the cell driver 162 connected to the $(n+1)^{th}$ gate line GLn+1 has a gate terminal connected to the $(n−1)^{th}$ gate line GLn−1, a source terminal connected to the $n^{th}$ gate line GLn, and a drain terminal connected to the first node N1 of the cell driver 162 connected to the $(n+1)^{th}$ gate line GLn+1. As a result, the bias switch SW does not receive an inverse voltage from an additional exterior source.

Further, scanning pulses may be sequentially applied to the gate lines the gate lines GLn−1, GLn, and GLn+1 as shown in FIG. 7. In particular, when the HIGH-state scanning pulse is applied to the $(n−1)^{th}$ gate line GLn−1, the switching thin film transistor T1 of the cell driver 162 connected to the $(n−1)^{th}$ gate line GLn−1 is turned ON. As the switching thin film transistor T1 is turned ON, a data signal supplied to the data line DL is applied to the first node N1 of the cell driver 162. Then, the driving thin film transistor T2 of the cell driver 162 is turned ON by the data signal applied to the first node N1, thereby applying a current I corresponding to the data signal from a source supplying the supply voltage VDD to the first reference voltage VSS1 and thus generating light corresponding to the current I from the EL cell OEL.

Moreover, the bias switch SW for supplying an inverse voltage to the cell driver 162 connected to the $(n+1)^{th}$ gate line GLn+1 is turned ON, when a HIGH-state scanning pulse is applied to the $(n−1)^{th}$ gate line GLn−1. When the bias switch SW is turned ON, a turn-off voltage supplied to the $n^{th}$ gate line GLn is applied to the first node N1 of the cell driver 162 connected to the $(n+1)^{th}$ gate line GLn+1. In particular, the turn-off voltage has a negative voltage (e.g., −5V), and voltage values of the first and second reference voltages VSS1 and VSS2 are set to be higher than the voltage value of the turn-off voltage. Thus, when the turn-off voltage is applied to the first node N1, an inverse bias voltage is applied to the driving thin film transistor T2, thereby preventing the threshold voltage Vth of the driving thin film transistor T2 from being increased with a lapse of time. That is, the inverse bias voltage is applied to the driving thin film transistor T2 of the cell driver 162 connected to the $(n+1)^{th}$ gate line GLn+1 by the turn-off voltage supplied to the $n^{th}$ gate line GLn when the HIGH-state scanning pulse is applied to the $(n−1)^{th}$ gate line GLn−1, thereby keeping the threshold voltage Vth of the driving thin film transistor T2 constant.

Figure 15:
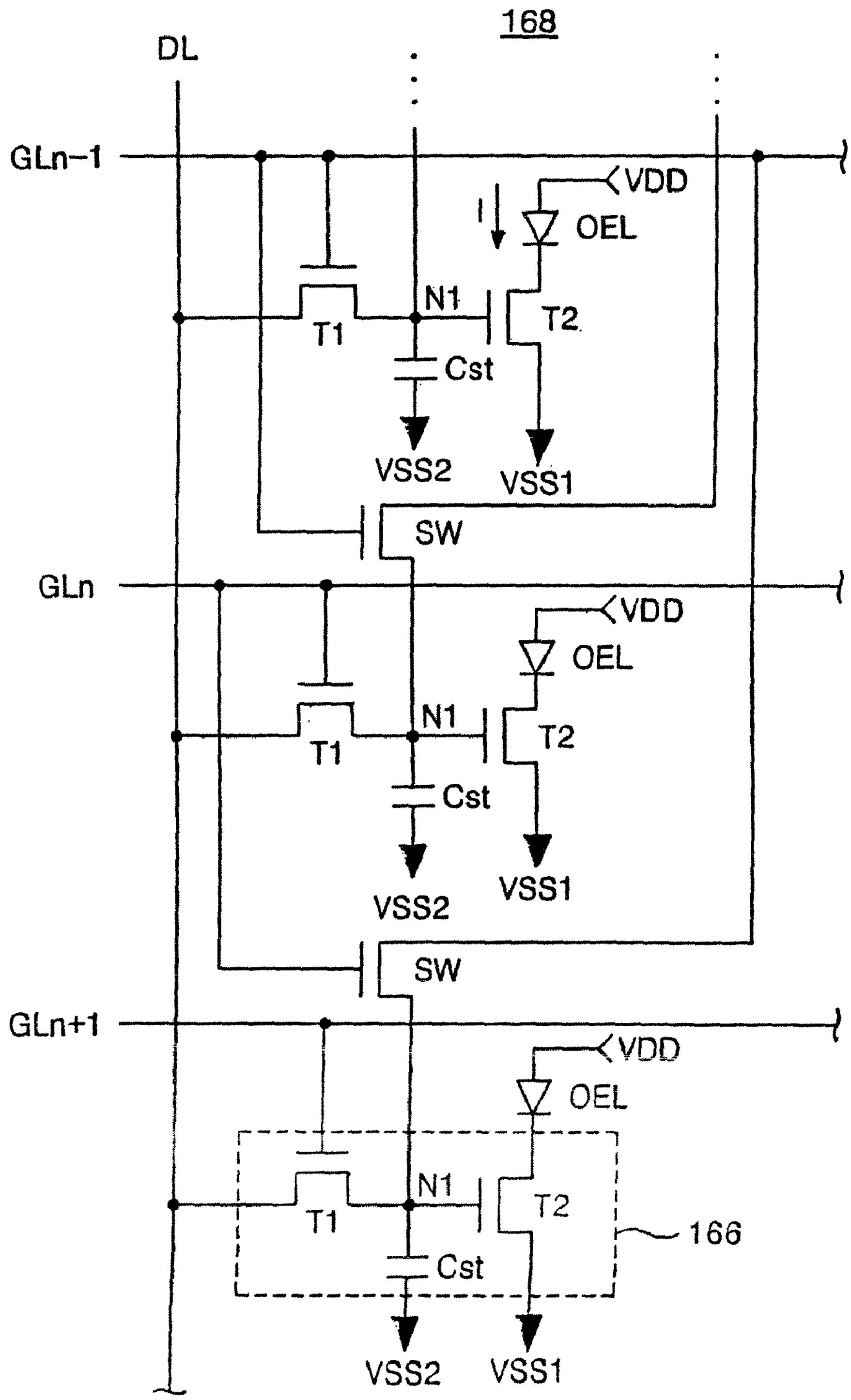
FIG. 15 is a detailed circuit diagram illustrating a pixel of an electro-luminescence display device according to another embodiment of the present invention.

FIG. 15 is a detailed circuit diagram illustrating a pixel of an electro-luminescence display device according to another embodiment of the present invention. In FIG. 15, an EL display device includes a plurality of pixels 168 arranged in pixel areas defined by intersection between gate lines GLn−1, GLn, and GLn+1 and data lines DL. Although only three gate lines GLn−1, GLn, and GLn+1, one data line DL, and three pixels 168 are shown, the EL display device may include more gate lines, data lines and pixels, such that the pixels 168 are arranged in a matrix-like manner. In addition, each of the pixels 168 includes an EL cell OEL, a cell driver 166 and a bias switch SW. The EL cell OEL includes an anode connected to receive a supply voltage VDD and a cathode connected to the cell driver 166.

The cell driver 166 includes a switching thin film transistor T1, a driving thin film transistor T2, and a storage capacitor Cst. The storage capacitor Cst is connected to a source supplying a second reference voltage VSS2 and to a first node N1. In particular, the switching thin film transistor T1 includes a gate terminal connected to a respective one of the gate lines GLn−1, GLn, and GLn+1, a source terminal connected to the respective data line DL, and a drain terminal connected to the first node N1. The driving thin film transistor T2 includes a gate terminal connected to the first node N1, a source terminal connected to a source supplying a first reference voltage VSS1, and a drain terminal connected to the EL cell OEL.

In addition, the bias switch SW for supplying an inverse voltage to the cell driver 166 connected to the $(n+1)^{th}$ gate line GLn+1 has a source terminal connected to the $(n−1)^{th}$ gate line GLn−1, a gate terminal connected to the $n^{th}$ gate line GLn, and a drain terminal connected to the first node N1 of the cell driver 166 connected to the $(n+1)^{th}$ gate line GLn+1. As a result, the bias switch SW does not receive an inverse voltage from an additional exterior source.

Further, scanning pulses may be sequentially applied to the gate lines GLn−1, GLn, and GLn+1 as shown in FIG. 7. Thus, a voltage lower than a voltage at the source terminal of the driving thin film transistor T2 is applied to the gate terminal of the driving thin film transistor T2 of the cell driver 166 connected to the $(n+1)^{th}$ gate line GLn+1 by the turn-off voltage supplied to the $(n−1)^{th}$ gate line GLn−1 when the HIGH-state scanning pulse is applied to the $n^{th}$ gate line GLn.

In particular, the bias switch SW for supplying an inverse voltage to the cell driver 166 connected to the $(n+1)^{th}$ gate line GLn+1 is turned ON, when a HIGH-state scanning pulse is applied to the $n^{th}$ gate line GLn. When the bias switch SW is turned ON, a turn-off voltage supplied to the $(n−1)^{th}$ gate line GLn−1 is applied to the first node N1 of the cell driver 166 connected to the $(n+1)^{th}$ gate line GLn+1. In addition, the turn-off voltage has a negative voltage (e.g., −5V), and voltage values of the first and second reference voltages VSS1 and VSS2 are set to be higher than the voltage value of the turn-off voltage. Accordingly, when the turn-off voltage is applied to the first node N1, an inverse bias voltage is applied to the driving thin film transistor T2, thereby preventing the threshold voltage Vth of the driving thin film transistor T2 from being increased with a lapse of time. As a result, the threshold voltage Vth of the driving thin film transistor T2 constant is kept constant.

As described above, in an electro-luminescence display device according to an embodiment of the present invention, a voltage lower than a voltage at the source terminal of the driving thin film transistor is periodically applied to the gate terminal of the driving thin film transistor at each pixel. If the gate terminal of the driving thin film transistor is periodically supplied with a voltage lower than a voltage at the source terminal thereof, a deterioration of the driving thin film transistor is prevented. Accordingly, the threshold voltage of the driving thin film transistor remains constant despite a lapse of time, thereby preventing an image deterioration.

It will be apparent to those skilled in the art that various modifications and variations can be made in the electro-luminescence display device and the driving method thereof of the present invention without departing from the sprit or scope of the invention. Thus, it is intended that the present invention covers the modifications and variations of this invention provided they come within the scope of the appended claims and their equivalents.

What is claimed is:

1. An electro-luminescence display device comprising:

an electro-luminescence panel having a plurality of pixels at pixel areas defined by intersections between data lines and gate lines, the gate lines receiving one of a scanning pulse and a turn-off signal;

an electro-luminescence cell, a driving thin film transistor, a switching thin film transistor, a storage capacitor and a bias switch provided for each of the pixels, for the pixel connected to an $n^{th}$ gate line (GLn, n being an integer), the corresponding electro-luminescence cell connected to receive a supply voltage, the corresponding driving thin film transistor controlling a current amount flowing through the electro-luminescence cell, the corresponding bias switch selectively supplying the turn-off signal to a gate terminal of the corresponding driving thin film transistor;

a gate driver that sequentially applies the scanning pulse and the turn-off signal to the gate lines to sequentially drive the gate lines in the order of an $(n-2)^{th}$ gate line (GLn−2), and an $(n-1)^{th}$ gate line (GLn−1), the $n^{th}$ gate line (GLn); and a data driver that applies an analog data signal synchronized with the scan pulse to the data lines, wherein the bias switch for the pixel connected to the nth gate line (GLn) includes:

a drain terminal connected to the gate terminal of the driving thin film transistor for the pixel connected to the $n^{th}$ gate line (GLn);

a source terminal connected to the $(n-1)^{th}$ gate line (GLn−1); and a gate terminal connected to the $(n-2)^{th}$ gate line (GLn−2), wherein a first switching thin film transistor is connected to the $(n-2)^{th}$ gate line (GLn−2), a second switching thin film transistor is connected to the $(n-1)^{th}$ gate line (GLn−1), and a third switching thin film transistor is connected to the $n^{th}$ gate line (GLn).

2. The electro-luminescence display device according to claim 1, wherein the driving thin film transistor has a drain terminal connected to the electro-luminescence cell, and a source terminal connected to a first reference voltage source, wherein the gate terminal of the driving thin film transistor is connected to receive the turn-off signal.

3. The electro-luminescence display device according to claim 2 for the pixel connected to the $n^{th}$ gate line (GLn), the switching thin film transistor connected to the corresponding driving thin film transistor, a respective one of the data lines and the $n^{th}$ gate line, for applying a data signal supplied to the respective data line to the corresponding driving thin film transistor when the scanning pulse is applied to the $n^{th}$ gate line (GLn), and the storage capacitor connected between the gate terminal of the corresponding driving thin film transistor and a second reference voltage source.

4. The electro-luminescence display device according to claim 3, wherein the first reference voltage source and the second reference voltage source supply reference voltages having voltage values lower than a voltage value of the supply voltage.

5. The electro-luminescence display device according to claim 3, wherein a voltage value of the turn-off signal is lower than voltage values of reference voltages supplied by the first and second reference voltage sources.

6. The electro-luminescence display device according to claim 1, wherein when the scanning pulse is applied to the $(n-2)^{th}$ gate line (GLn−2), the bias switch for the pixel connected to the $n^{th}$ gate line (GLn) applies the turn-off signal supplied to the $(n-1)^{th}$ gate line (GLn−1) to the gate terminal of the driving thin film transistor for the pixel connected to the $n^{th}$ gate line (GLn).

7. A method of driving an electro-luminescence display device having an electro-luminescence cell, a driving thin film transistor, a switching thin film transistor, a storage capacitor and a bias switch provided for each of pixels arranged in a matrix-like manner, comprising:

sequentially applying a scanning pulse and a turn-off signal to gate lines to sequentially drive the gate lines in the order of an $(n-2)^{th}$ gate line (GLn−2, n being an integer), an $(n-1)^{th}$ gate line (GLn−1), and the $n^{th}$ gate line (GLn); and applying an analog data signal synchronized with the scan pulse to the data lines, wherein the bias switch for the pixel connected to the $n^{th}$ gate line (GLn) includes:

a drain terminal connected to the gate terminal of the driving thin film transistor for the pixel connected to the $n^{th}$ gate line (GLn);

a source terminal connected to the $(n-1)^{th}$ gate line (GLn−1); and a gate terminal connected to the $(n-2)^{th}$ gate line (GLn−2), wherein a first switching thin film transistor is connected to the $(n-2)^{th}$ gate line (GLn−2), a second switching thin film transistor is connected to the $(n-1)^{th}$ gate line (GLn−1), and a third switching thin film transistor is connected to the $n^{th}$ gate line (GLn).

8. The method according to claim 7, further comprising setting a voltage value of said turn-off voltage to be lower than a voltage value of a reference voltage supplied by the reference voltage source.

9. The method according to claim 7, wherein said turn-off voltage supplied to an $(n-2)^{th}$ one of the gate lines (GLn−2) is applied to the gate terminal of the driving thin film transistor for the pixel connected to the $n^{th}$ gate line (GLn) when said scanning pulse is applied to an $(n-1)^{th}$ one of the gate lines (GLn−1).

* * * * *